(12) United States Patent
Sato et al.

(10) Patent No.: US 7,266,165 B2
(45) Date of Patent: Sep. 4, 2007

(54) CODE DISTINGUISHING APPARATUS

(75) Inventors: Ken Sato, Tokyo (JP); Nobuaki Kawahara, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 709 days.

(21) Appl. No.: 10/785,056

(22) Filed: Feb. 25, 2004

(65) Prior Publication Data

US 2004/0179634 A1 Sep. 16, 2004

(30) Foreign Application Priority Data

Mar. 11, 2003 (JP) ............................. 2003-064468

(51) Int. Cl.
*H04L 27/06* (2006.01)
*H04B 1/69* (2006.01)

(52) U.S. Cl. ...................................... 375/343; 375/150

(58) Field of Classification Search ................ 375/142, 375/144, 148, 150, 260, 267, 343; 374/343
See application file for complete search history.

(56) References Cited

U.S. PATENT DOCUMENTS

| | | | |
|---|---|---|---|
| 5,838,721 A * | 11/1998 | Chau et al. | 375/150 |
| 6,990,140 B2 * | 1/2006 | Loomis et al. | 375/148 |
| 2001/0050950 A1 * | 12/2001 | Sato | 375/150 |

FOREIGN PATENT DOCUMENTS

| | | |
|---|---|---|
| JP | A 5-7195 | 1/1993 |
| JP | A 11-196026 | 7/1999 |
| JP | A 2002-148326 | 5/2002 |

OTHER PUBLICATIONS

Masakazu Sampei, "Application of Digital Wireless Transmission for Digital Wireless Communications," Pearson Education Japan, Sep. 1, 2002, pp. 298-299.
http://libl.nippon-foundation.or.jp/1998/0478/contents/076.htm.

* cited by examiner

*Primary Examiner*—Young T. Tse
(74) *Attorney, Agent, or Firm*—Oliff & Berridge, PLC (57) ABSTRACT

A unique word that can be contained in transmittal data is to be accurately distinguished. A correlation detecting section 36 calculates correlations A through N between received data containing one of a plurality of unique words A through N and the unique words A through N respectively characteristic of the information transmission rates A through N. For the unique words A through N, the thresholds A through N are respectively set, and a formula distinguishing section 342, when a correlation i (i is one of A through N) is above a threshold i, a unique word i is contained in the received data, and supplies formula type data indicating that the received data have been generated at an information transmission rate i matching the unique word i. A threshold altering section 380, upon distinguishment of a unique word, performs alteration to reduce a value of the threshold i and enlarge values of other thresholds.

2 Claims, 10 Drawing Sheets

CODE DISTINGUISHING APPARATUS

BACKGROUND OF THE INVENTION

1. Field of the Invention

The present invention relates to a code distinguishing apparatus for use in distinguishing unique words in communication among other purposes.

More particularly, the invention relates to a code distinguishing apparatus for use in switching over from one communication formula to another.

2. Description of the Related Art

For instance, Patent References 1 through 3 disclose methods to identify correlations among codes contained in received signals.

Or Non-Patent Reference 1, for example, discloses on pp. 298-299 a method by which a unique word is contained in the preamble of the transmittal frame of the TDMA system when it is transmitted.

Another example is a method of identifying the correlation between input data and a unique word, disclosed in Non-Patent Reference 2.

As the unique word in the transmittal frame is set to a value characteristic of each communication formula, it is possible to know by distinguishing the unique word what communication formula was used in transmitting the received data.

However, none of the references cited above takes note of this point and discloses a method by which the communication formula can be identified by distinguishing the unique word.

Patent Reference 1: Japanese Published Unexamined Patent Application No. Hei 11-196026

Patent Reference 2: Japanese Published Unexamined Patent Application No. 2002-148326

Patent Reference 3: Japanese Published Unexamined Patent Application No. Hei 5-7195

Non-Patent Reference 1: Masakazu Sampei, Application of Digital Wireless Transmission for Digital Wireless Communications, Pearson Education Japan, first print of first edition published on Sep. 1, 2002, ISBN4-89471-560-0

Non-Patent Reference 2: http://libl.nippon-foundation-.or.jp/1998/0478/contents/076.htm

SUMMARY OF THE INVENTION

An object of the present invention, which was attempted in view of the background circumstances noted above, is to provide a code distinguishing apparatus capable of precisely distinguishing the code that is sought for whichever of a plurality of conceivable codes may be contained in transmitted data.

Another object of the invention is to provide a code distinguishing apparatus capable of precisely distinguishing a unique word attached thereto from data irrespective of whatever communication formula the data may be transmitted by.

In order to solve the problems noted above, a code distinguishing apparatus according to the invention is intended to detect any one of a plurality of codes contained in object data of code distinguishment, each code having its characteristic value, having: correlation calculating means for calculating a plurality of correlations indicating a correlation between each of the plurality of codes and the object data, code distinguishing means for distinguishing which of the plurality of codes any code contained in the object data is on the basis of the plurality of calculated correlations and a plurality of sets of distinguishing data respectively set for the plurality of codes and indicating a range of values that the plurality of correlations should have, the correlations being respectively calculated from the plurality of sets of object data respectively containing the plurality of codes, and distinguishing data altering means for altering, when a code contained in the object data has been distinguished, for altering the respective values of the plurality of sets of distinguishing data.

It is preferable for the object data to be transmitted by one of a plurality of communication systems, each of the plurality of codes to be a unique word which takes a characteristic value matching one of the plurality of communication systems, and the plurality of sets of distinguishing data to indicate a lower limit, or an upper limit and the lower limit, of a plurality of correlations respectively calculated from the plurality of sets of object data containing the plurality of unique words respectively; the distinguishing data altering means, when any unique word contained in the object data has been distinguished, to expand a range of first sets of distinguishing data set for the distinguished unique word and to narrow the range of the first sets of distinguishing data set for unique words other than the distinguished unique word to obtain a plurality of second sets of distinguishing data, and the code distinguishing means to distinguish, as a unique word contained in the object data, a unique word that gives a correlation within a range indicated by either the plurality of first sets of distinguishing data or the plurality of second sets of distinguishing data.

It is preferable for the code distinguishing apparatus to further include receiving means for receiving the transmitted object data by one of the plurality of communication systems, and switching means for switching over a communication system in the receiving means to a communication system matching the distinguished unique word.

BRIEF DESCRIPTION OF THE DRAWINGS

FIG. 8 is a first diagram illustrating typical operations of a receiving apparatus to which the second formula distinguishing program shown in FIG. 7 is adapted, wherein (A) represents the timing of the transmittal frame shown in FIG.

3, (B) through (D) respectively represent correlations A, B and N, and (E) represents a distinguished unique word (formula type data);

DETAILED DESCRIPTION OF THE PREFERRED EMBODIMENTS

First Embodiment

A first preferred embodiment of the present invention will be described below.

Figure 1:
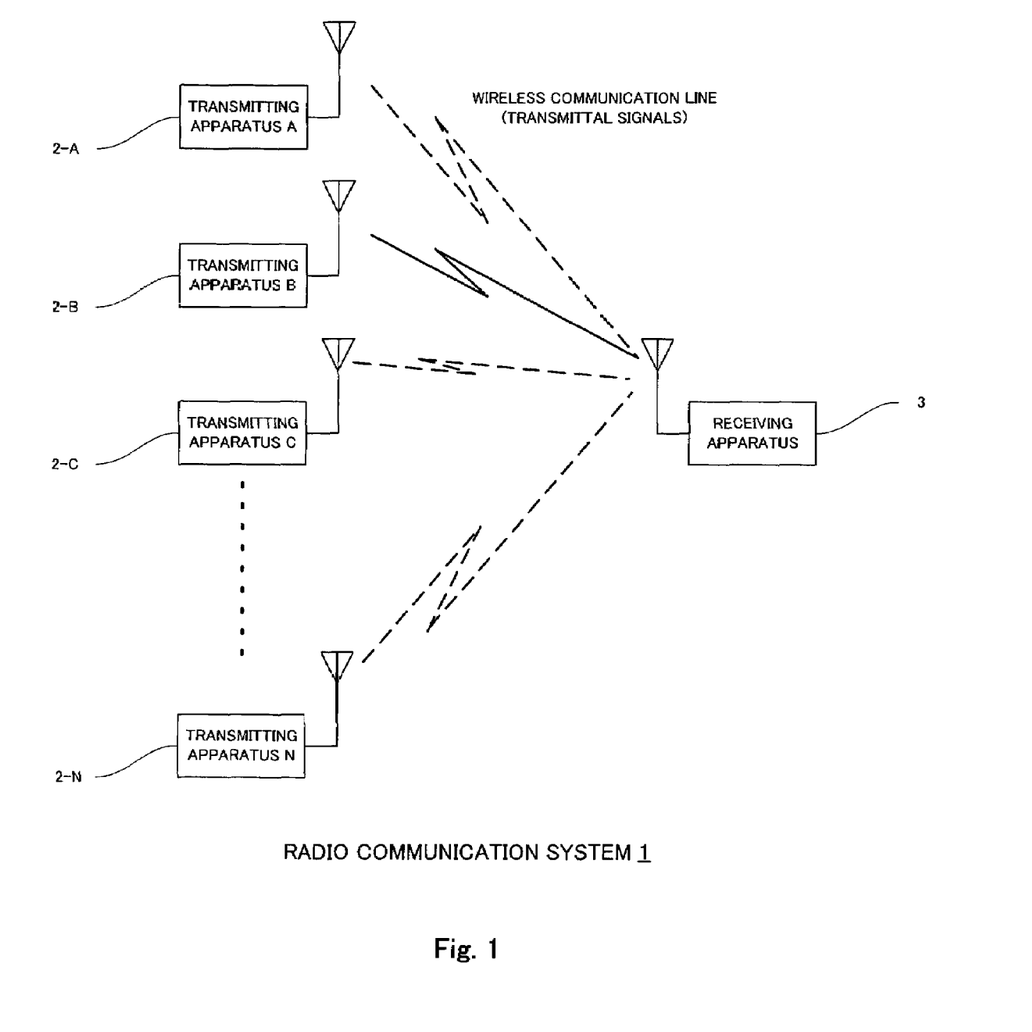
FIG. 1 illustrates a typical configuration of a radio communication system to which code distinguishment according to the present invention is adapted.

FIG. 1 illustrates a typical configuration of a radio communication system 1 to which code distinguishment according to the invention is adapted.

As shown in FIG. 1, the radio communication system 1 comprises a plurality of transmitting apparatuses 2-A through 2-N for transmitting data, each at a different one of information transmission rates (communication formulas) A through N from others, and a receiving apparatus 3 capable of receiving data from any of the transmitting apparatuses 2-A through 2-N.

Incidentally in FIG. 1, a case in which the receiving apparatus 3 receives data from the transmitting apparatus 2-B is shown, as indicated by the solid line between them.

[Transmitting Apparatus 2]

In the following description, when any unspecified one of a plurality of similar constituent elements, such as the transmitting apparatuses 2-A through 2-N, is referred to, it may be simply referred to as the transmitting apparatus 2 and the like.

Figure 2:
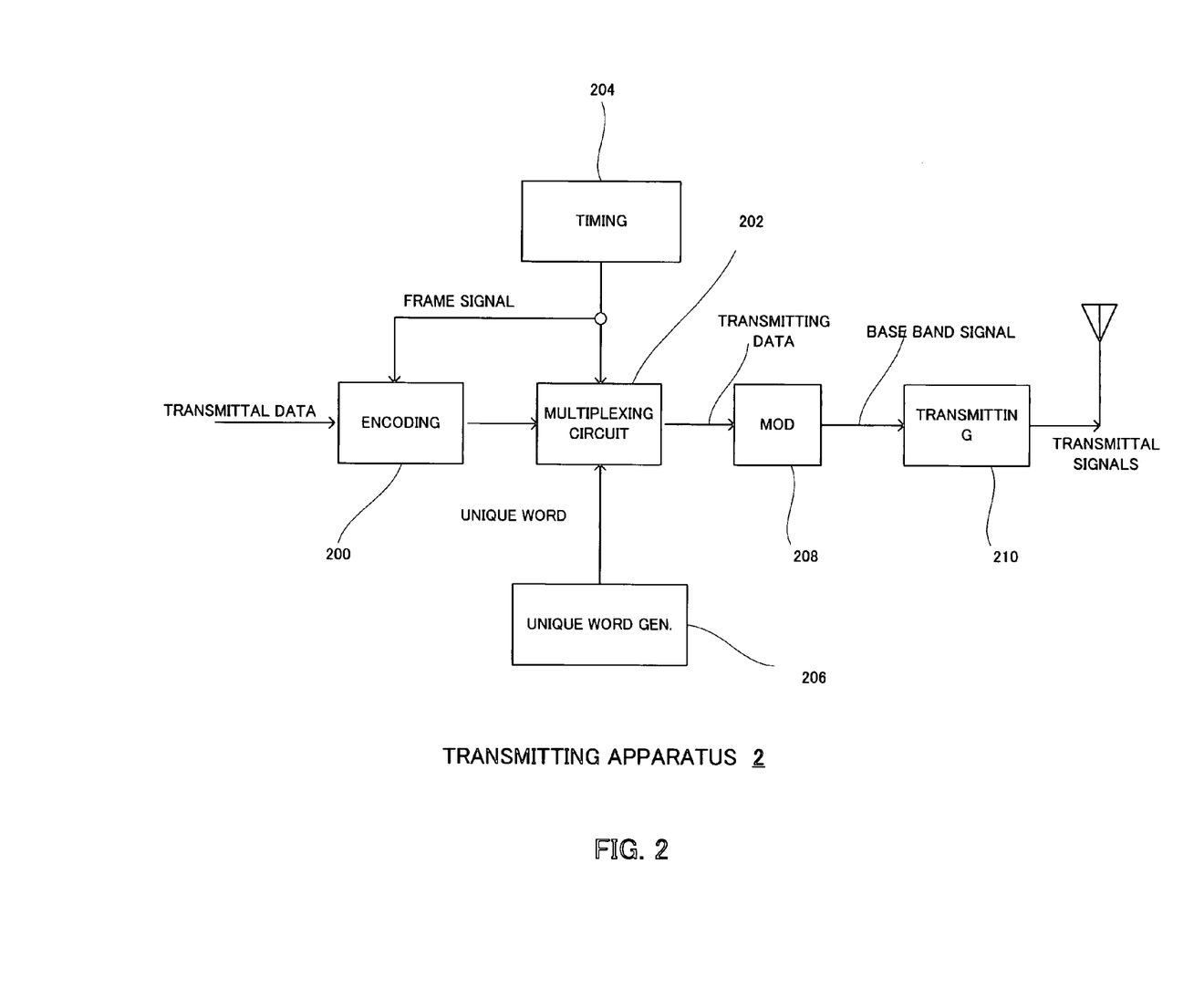
FIG. 2 illustrates the configuration of one of the transmitting apparatuses shown in FIG. 1.

FIG. 2 illustrates the configuration of one of the transmitting apparatuses 2 shown in FIG. 1.

As shown in FIG. 2, each of the transmitting apparatuses 2 comprises an encoding circuit 200, a multiplexing circuit 202, a timing circuit 204, a unique word generating circuit 206, a modulating circuit 208 and a transmitting circuit 210.

The functions of these constituent parts of the transmitting apparatus 2 can be implemented either by hardware or software as appropriate.

Each of the transmitting apparatuses 2-A through 2-N (FIG. 1), using these constituent parts, transmits transmittal data entered from an external apparatus such as a computer (not shown), to the receiving apparatus 3 via a wireless communication line at one of the information transmission rates A through N characteristic of it.

The timing circuit 204 generates a frame signal which defines the timings of the encoding of transmittal data and of the multiplexing of transmittal data and a preamble, and supplies it to the constituent parts of the transmitting apparatus 2.

In each of the transmitting apparatuses 2-A through 2-N, the encoding circuit 200 encodes the transmittal data entered from outside in accordance with the matching one of the information transmission rates A through N, and supplies the encoded data to the multiplexing circuit 202.

The unique word generating circuit 206 generates a unique word which takes a value characteristic of each of the information transmission rates A through N, and supplies it to the multiplexing circuit 202.

Figure 3:
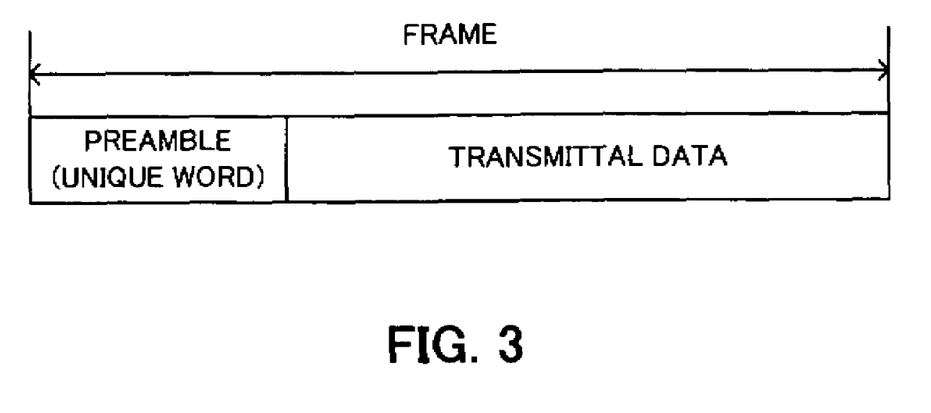
FIG. 3 illustrates an example of transmittal frame for use in the transmitting apparatuses shown in FIG. 2.

FIG. 3 illustrates an example of a transmittal frame for use in the transmitting apparatuses shown in FIG. 2.

In each of the transmitting apparatuses 2-A through 2-N, the multiplexing circuit 202 splits, in accordance with the matching one of the information transmission rates A through N, the transmittal data entered from the encoding circuit 200, and accommodates the split data into one or more of the transmittal frames, an example of which is shown in FIG. 3.

Further, the multiplexing circuit 202 accommodates in the preamble part of the transmittal frame illustrated in FIG. 3 a unique word characteristic of each of the information transmission rates A through N entered from the unique word generating circuit 206, and generates transmitting data.

The modulating circuit 208 modulates carrier signals with transmitting data entered from the multiplexing circuit 202 into IF signals by some modulation formula such as 16QAM, QPSK or BPSK, and supplies the modulated signals to the transmitting circuit 210.

The transmitting circuit 210 converts the frequency of the IF signals entered from the modulating circuit 208 into the frequency of the wireless communication line, power-amplifies the signals, and transmits the amplified signals to the wireless communication line as transmittal signals.

[Receiving Apparatus 3]

Figure 4:
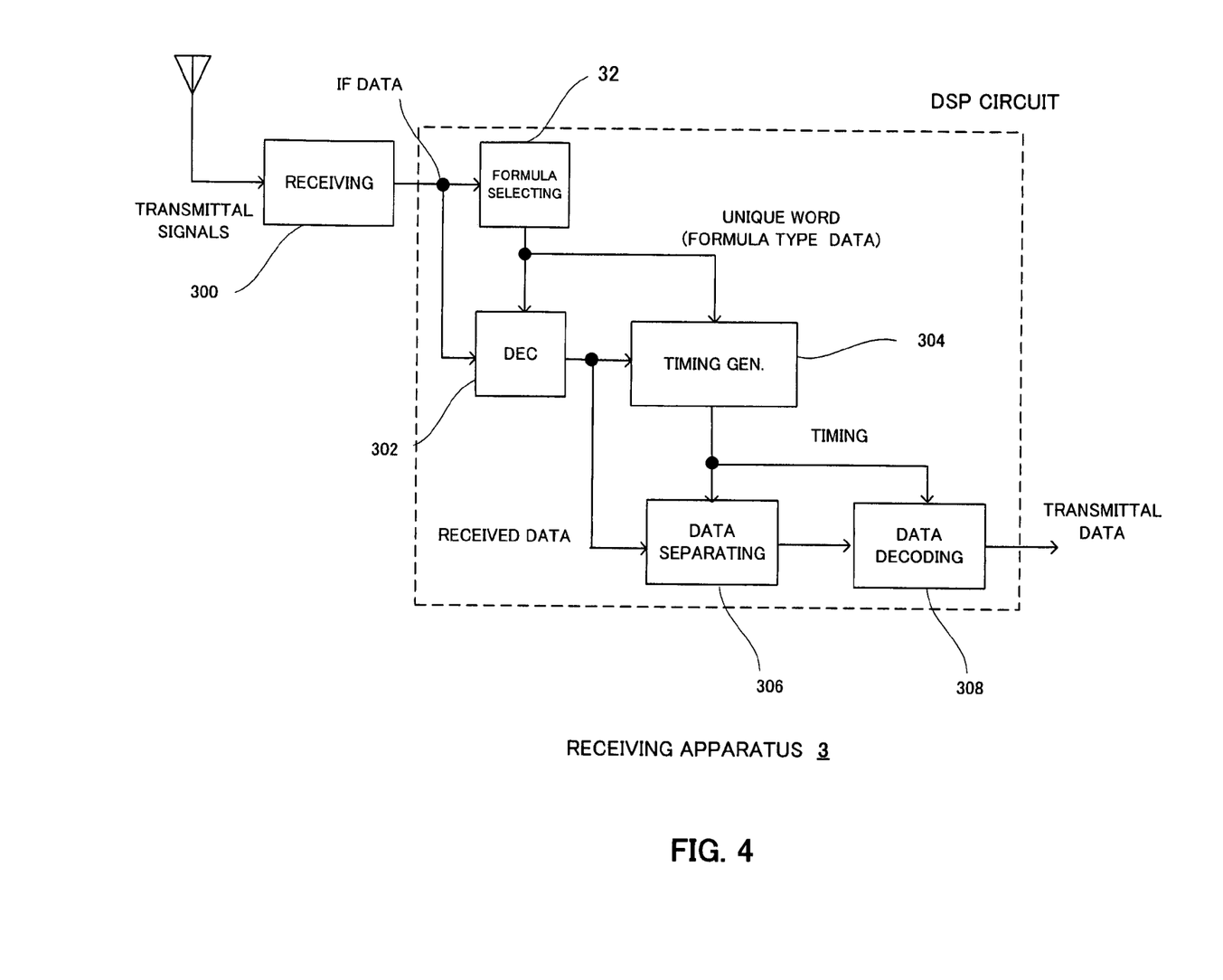
FIG. 4 illustrates the configuration of a receiving apparatus shown in FIG. 1.

FIG. 4 illustrates the configuration of the receiving apparatus 3 shown in FIG. 1.

As shown in FIG. 4, the receiving apparatus 3 comprises a receiving circuit 300, a decoding section 302, a formula selecting section 32, a timing generating section 304, a data separating section 306 and a data decoding section 308.

Incidentally in FIG. 4, illustration of the flow of data is abridged where appropriate for the sake of simplicity.

The specific example described below is a case in which constituent parts of the receiving apparatus 3 other than the receiving circuit 300 are implemented by software operating on a DSP circuit.

This DSP circuit comprises, for instance, a digital signal processor (DSP), an A/D converting circuit for converting IF signals into digital IF data, a ROM, a RAM and their peripheral circuits (none of them shown).

The receiving apparatus 3, using these constituent parts, restores transmittal data from the transmittal signals received from one of the transmitting apparatuses 2-A through 2-N (the transmitting apparatus 2-i, where i may be any of A through N) via the wireless communication line, and supplies them to an external apparatus such as a computer (not shown).

The receiving circuit 300 receives transmittal signals from the transmitting apparatus 2-i (FIG. 1 and FIG. 2) via the wireless communication line, subjects them to amplification and frequency conversion, and supplies them to the DSP circuit as intermediate frequency (IF) signals of a frequency that permits A/D conversion in the DSP circuit.

Incidentally, if automatic gain control (AGC) is applied in the receiving circuit 300, the intensity and correlation (to be described later) of the IF signals become almost insusceptible to the influence of the intensity of the received transmittal signals.

The A/D converting circuit (not shown) of the DSP circuit (FIG. 4) converts the IF signals into digital IF data.

The formula selecting section 32 is, for instance, a first or second formula distinguishing program 34 or 38 to be described later with reference to FIG. 5 or FIG. 7. It distinguishes a unique word characteristic of one of the information transmission rates A through N contained in the IF data.

Further, the formula selecting section 32 generates formula type data indicating which of the information transmission rates A through N has generated the IF data (transmittal signals), and supplies the formula type data to the decoding section 302 and the timing generating section 304 among others.

[First Formula Distinguishing Program 34]

Figure 5:
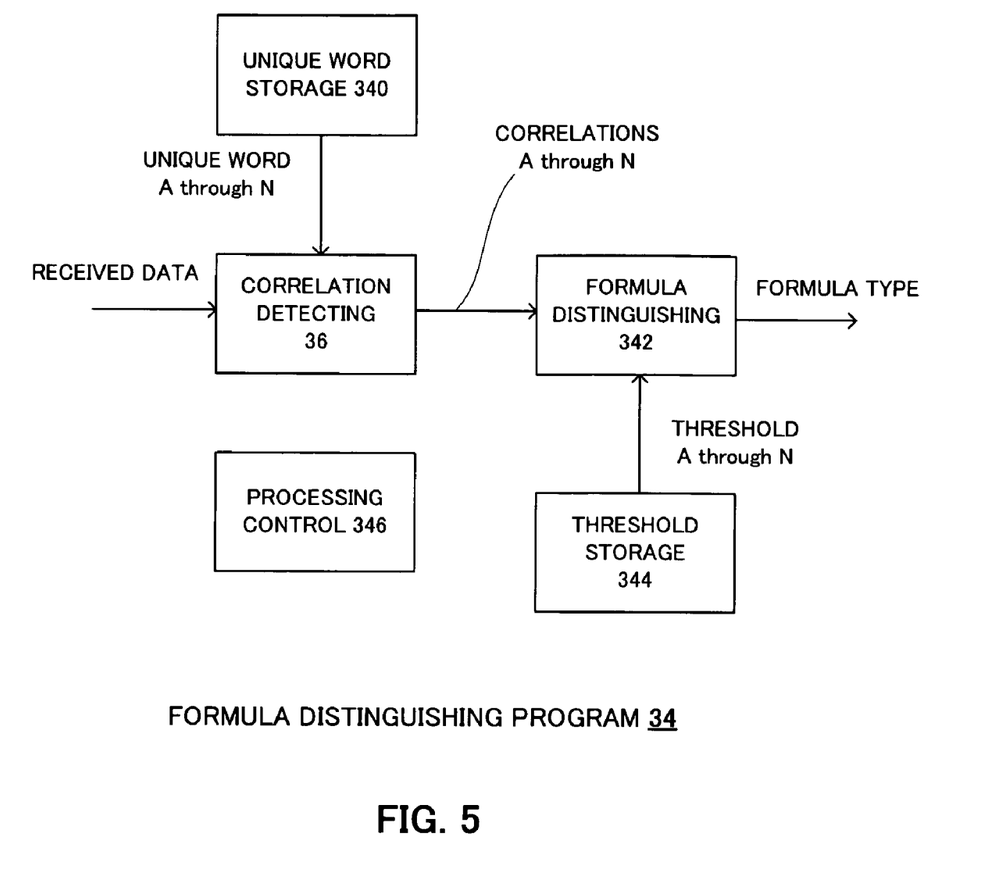
FIG. 5 illustrates the configuration of a first formula distinguishing program used as a formula selecting section shown in FIG. 4 and is intended to distinguish a unique word from among received data.

FIG. 5 illustrates the configuration of the first formula distinguishing program 34 used as the formula selecting section 32 shown in FIG. 4 and is intended to distinguish a unique word from among the IF data.

As shown in FIG. 5, the formula distinguishing program 34 comprises a unique word storage section 340, a correlation detecting section 36, a formula distinguishing section 342, a threshold storage section 344 and a processing control section 346. It is supplied in, for instance, a form stored in a ROM, to the DSP circuit (FIG. 4) of the receiving apparatus 3, and executed.

The formula distinguishing program 34, using these constituent parts, distinguishes a unique word contained in the IF data (transmittal signals), and generates the aforementioned formula type data.

In the formula distinguishing program 34, the processing control section 346 controls the processing by each of the constituent parts of the formula distinguishing program 34.

The unique word storage section 340 stores unique words A through N respectively matching the information transmission rates A through N used by the transmitting apparatuses 2-A through 2-N for data transmission and being orthogonal to each other, and supplies them to the formula distinguishing program 34.

The IF data and unique words are entered into the correlation detecting section 36 as data of an I and O vector form.

The correlation detecting section 36 multiplies each of the sets of the IF data obtained by A/D conversion of the IF signals as described above by the two sets of carrier data apart by 90° from each other as the phase of an IF signal carrier (if the sampling frequency is four times the carrier frequency, 1, 0, −1 and 0 on one hand and 0, 1, 0 and −1 on the other will be appropriate), and thereby obtains I data and Q data.

Further, the correlation detecting section 36 determines respective conjugates of these I data and Q data on one hand and the I and Q components of the unique words A through N on the other, and subjects them to complex multiplication.

Incidentally, if the unique word permits BPSK demodulation, the Q component of the unique word will be 0.

The correlation detecting section 36 adds as many of the results of these complex multiplications as the number of unique word samples to obtain correlations A through N.

The correlation detecting section 36 supplies the correlations A through N thereby obtained to the formula distinguishing section 342.

The threshold storage section 344 (FIG. 5) stores thresholds A through N to be used for determining which of the unique words A through N is contained in the IF data, and supplies them to the formula distinguishing section 342.

Incidentally, the values of the thresholds A through N may either be all the same or different characteristic values appropriately selected for the respective information transmission rates A through N.

The formula distinguishing section 342 compares the correlations A through N entered from the correlation detecting section 36 (FIG. 5) with the respective thresholds A through N entered from the threshold storage section 344 and, if a threshold i (i is one of A through N) is found to be smaller than the matching correlation i, determines that a unique word i is contained in the IF data.

The formula distinguishing section 342 supplies formula type data indicating the information transmission rate i matching the distinguished unique word i to the decoding section 302, the timing generating section 304, the data separating section 306 and the data decoding section 308 (FIG. 4).

The decoding section 302 (FIG. 4), in accordance with the formula type data entered from the formula selecting section 32 (the formula distinguishing program 34), demodulates the IF data entered from the receiving circuit 300 to convert them into received data matching the transmitting data.

The timing generating section 304, in accordance with the formula type data entered from the formula distinguishing section 342, generates a timing synchronized with data contained in the demodulated IF data, and supplies it to the data separating section 306 and the data decoding section 308.

The data separating section 306, in accordance with the formula type data and the timing indicated by the timing generating section 304, separates the data contained in the demodulated IF data.

The data decoding section 308, in accordance with the formula type data and the timing indicated by the timing generating section 304, decodes the separated data to make them transmittal data.

[Overall Operation]

The overall operation of the radio communication system 1 where the first formula distinguishing program 34 is used as the formula selecting section 32 (FIG. 4) of the receiving apparatus 3 (FIG. 1) will be described below.

Incidentally, whereas a case in which the receiving apparatus 3 has received a transmittal signal from the transmitting apparatus 2-A will be described below as a specific example to make the description clear and simple, the operation of the radio communication system 1 and the technical scope of the present invention are not limited to this specific example.

The transmitting apparatuses 2-A through 2-N (FIG. 1 and FIG. 2) generate sets of transmittal data containing the unique words A through N in the preambles of their respective transmittal frames (FIG. 3).

Further, each of the transmitting apparatuses 2-A through 2-N generates a transmittal signal from the generated transmittal data, and transmits it to the wireless communication line.

The receiving circuit 300 (FIG. 4) of the receiving apparatus 3 receives the transmittal signal from the transmitting apparatus 2-A, and supplies it to the DSP circuit as an IF signal.

The DSP circuit (FIG. 4) executes the first formula distinguishing program 34 (FIG. 5), and the A/D converting circuit (not shown) of the DSP circuit converts the IF signal entered from the receiving circuit 300 into digital IF data, which is supplied to the correlation detecting section 36.

The correlation detecting section 36 (FIG. 5) of the formula distinguishing program 34 generates the correlations A through N indicating the respective relationships between the IF data and the unique words A through N entered from the unique word storage section 340, and supplies them to the formula distinguishing section 342.

The formula distinguishing section 342 compares the thresholds A through N entered from the threshold storage section 344 with the correlations A through N, determines that the IF data contains the unique word A matching the correlation A representing a greater value than the threshold A, and supplies formula type data representing the information transmission rate A matching this unique word A to the decoding section 302 and the timing generating section 304.

The decoding section 302 decodes the IF data in accordance with the formula type data entered from the formula distinguishing program 34 to make them received data.

The timing generating section (FIG. 4) 304 generates a timing appropriate for the information transmission rate A indicated by the formula type data A entered from the formula distinguishing section 342 (FIG. 5), and supplies it to the data separating section 306 and the data decoding section 308.

The data separating section 306 separates transmittal data from the transmittal frame (FIG. 3) by performing processing appropriate for the information transmission rate A and matching the multiplexing circuit 202 of the transmitting apparatus 2-A, and supplies the separated data to the data decoding section 308.

The data decoding section 308 decodes the transmittal data by performing processing appropriate for the information transmission rate A and matching the encoding circuit 200 of the transmitting apparatus 2-A.

The data decoding section 308 supplies an external apparatus and other destinations with the transmittal data obtained as the result of decoding.

Second Embodiment

A second preferred embodiment of the present invention will be described below.

Figure 6:
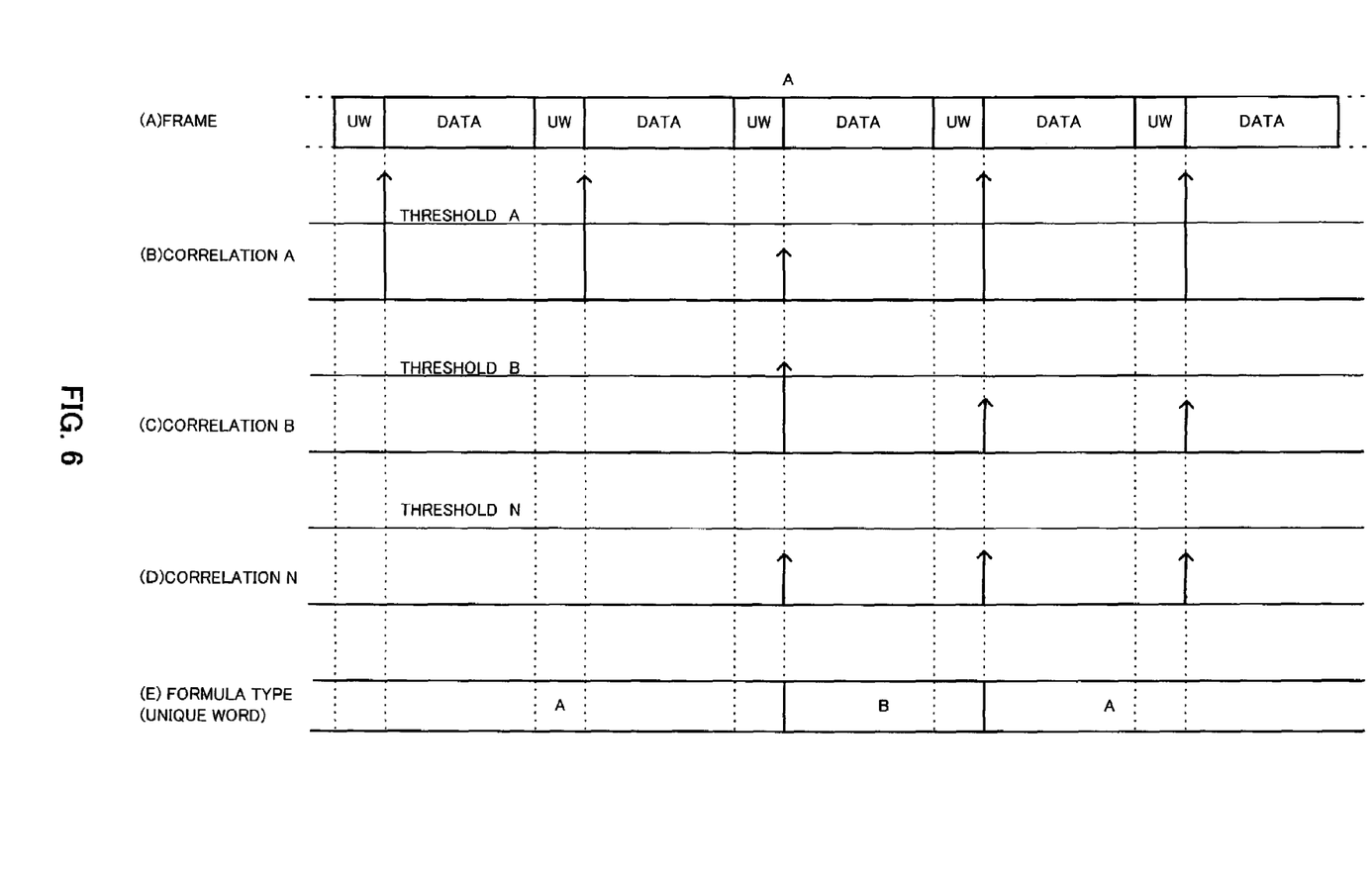
FIG. 6 illustrates typical operations of a receiving apparatus 3 to which the first formula distinguishing program 34 shown in FIG. 5 is adapted, wherein (A) represents the timing of the transmittal frame shown in FIG. 3,(B) through (D) respectively represent correlations A, B and N, and (E) represents a distinguished unique word (formula type data)

FIG. 6 illustrates typical operations of the receiving apparatus 3 to which the first formula distinguishing program 34 shown in FIG. 5 is adapted, wherein (A) represents the timing of the transmittal frame shown in FIG. 3,(B) through (D) respectively represent correlations A, B and N, and (E) represents a distinguished unique word (formula type data).

When, for instance, the formula distinguishing program 34 distinguishes the unique word A from the IF data as described above, for some reason the correlation A (FIG. 6(B)) may fall below the threshold A and the correlation B (FIG. 6(C)) may rise above the threshold B at a timing a indicated by attaching a code a.

In this case, the formula distinguishing program 34 would erroneously detect the unique word B from the received data as shown in FIG. 6(E) from the timing a until the correlation A again rises above the threshold A and the correlation B falls below threshold B.

Once a wrong unique word is detected from the received data under the influence of noise or otherwise, the data separating section 306 and the data decoding section 308 (FIG. 4) will also operate erroneously.

The second formula distinguishing program 38 described below is not affected by this trouble encountered by the first formula distinguishing program 34.

[Formula Distinguishing Program 38]

Figure 7:
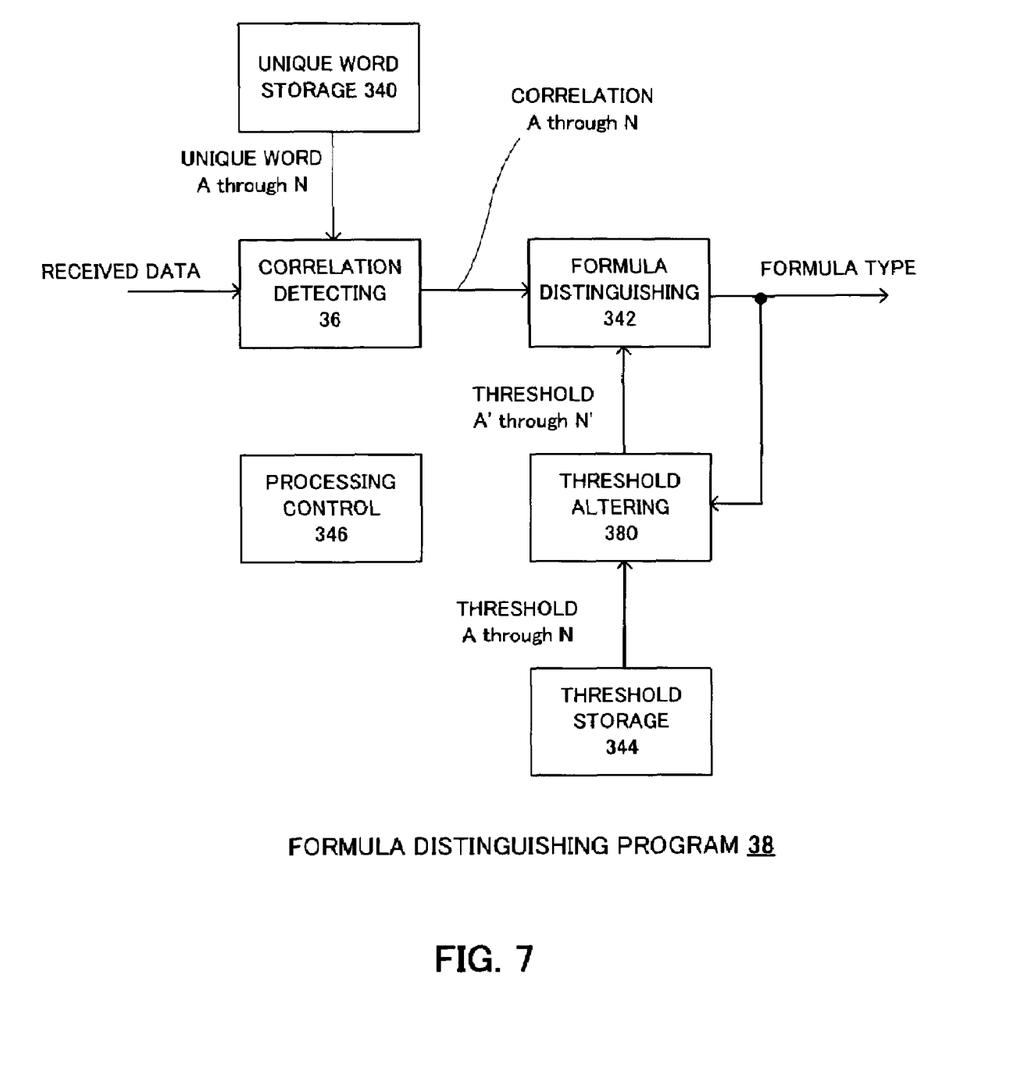
FIG. 7 illustrates the configuration of a second formula distinguishing program executed in place of the first formula distinguishing program (FIG. 5) to distinguish a unique word from IF data.

FIG. 7 illustrates the configuration of the second formula distinguishing program 38 executed in place of the first formula distinguishing program 34 (FIG. 5) to distinguish a unique word from IF data.

Incidentally in FIG. 7, of the constituent parts of the second formula distinguishing program 38, those substantially the same as the corresponding constituent parts of the first formula distinguishing program 34 are denoted by respectively the same signs.

As shown in FIG. 7, the second formula distinguishing program 38 has a configuration in which a threshold altering section 380 is added between the threshold storage section 344 and the formula distinguishing section 342 of the first formula distinguishing program 34.

The threshold altering section 380 alters the thresholds A through N entered from the threshold storage section 344 in accordance with the result of distinguishment by the formula distinguishing section 342, and supplies them to the formula distinguishing section 342 as altered thresholds A' through N'.

The threshold altering section 380, when the formula distinguishing section 342 has detected the unique word A from the received data and supplies the formula type data A representing the information transmission rate A of the transmitting apparatus 2-A, reduces the value of the threshold A entered from the threshold storage section 344, enlarges the values of all other thresholds j (j=B through N), and supplies them to the formula distinguishing section 342.

The step by which the threshold altering section 380 is to alter the threshold can be selected from among a number of alternatives including a simple integral fraction of the maximum correlation and an integral fraction of the logarithm of the maximum correlation.

Figure 8:
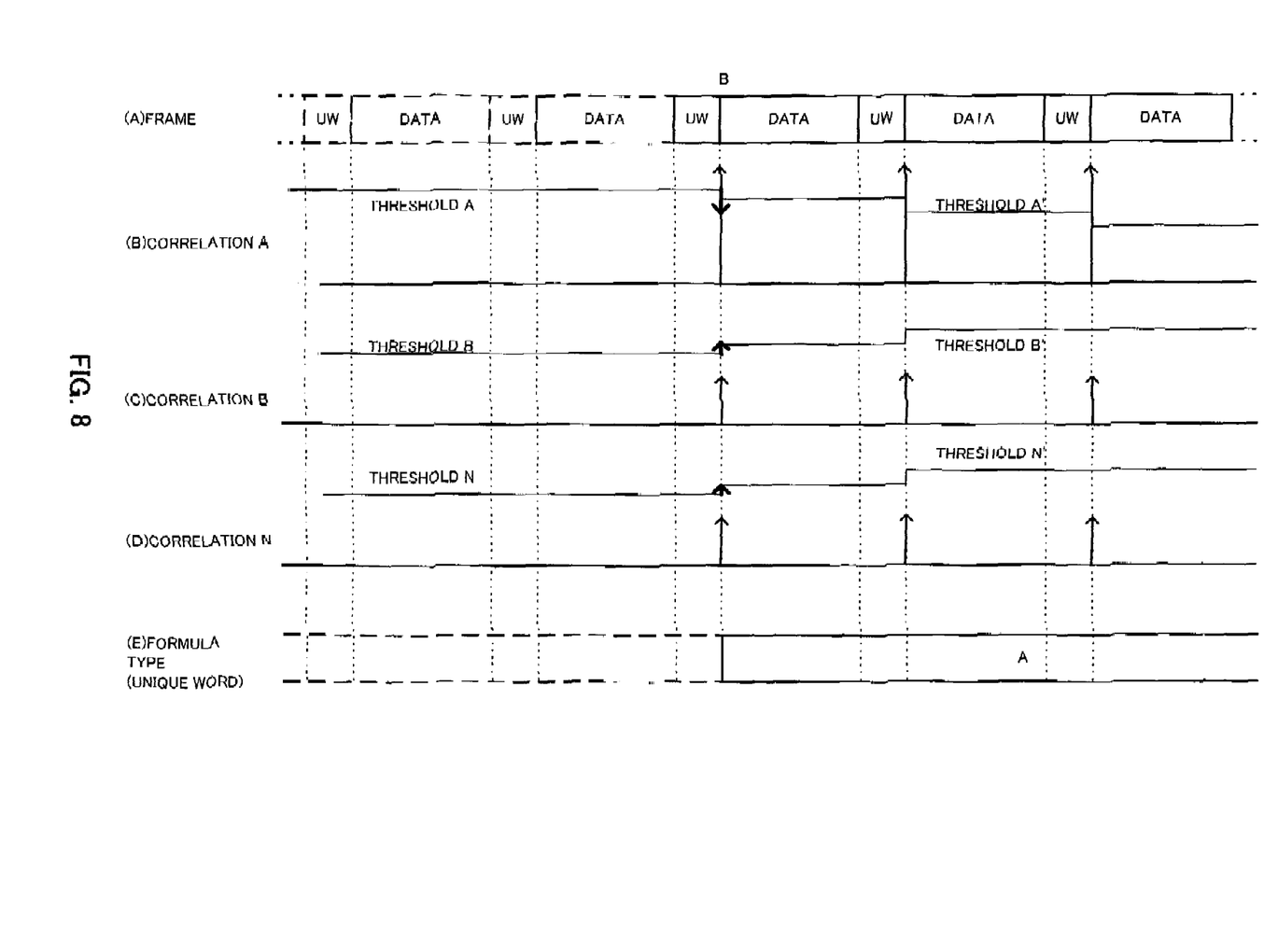

FIG. 8 is a first diagram illustrating typical operations of the receiving apparatus 3 to which the second formula distinguishing program 38 shown in FIG. 7 is adapted, wherein (A) represents the timing of the transmittal frame shown in FIG. 3,(B) through (D) respectively represent correlations A, B and N, and (E) represents the distinguished unique word (formula type data).

Thus, as exemplified in FIG. 8(B) through (D), when the formula distinguishing section 342 distinguishes the unique word A from the received data at a timing b indicated by attaching a code b shown in FIG. 8, the threshold altering section 380 performs alterations of reducing from 9 to 7 the value of the threshold A entered from the threshold storage section 344 and enlarging from 8 to 10 the values of all other thresholds B through N, and supplies the altered values to the formula distinguishing section 342.

Incidentally, although the case in which only the thresholds A through N representing the lower limit of the correlation are provided has been described so far, it is also conceivable to provide thresholds A" through N" representing the upper limit of the correlation and to detect a unique word i only when the correlation is within the range of the threshold i (i=A through N).

For altering the thresholds A through N by the threshold altering section 380, the respective upper and lower limits (or either the respective upper or lower limits) of the thresholds A through N or the upper and lower limits (or either the upper or lower limit) common to the thresholds A through N can be set, and the alterations can be performed within the optimal range where the distinction of unique words is not adversely affected.

Incidentally, as the lower and upper limits referred to above, for instance, values calculated by multiplying the average of the past few normally distinguished correlation (peak) values by prescribed coefficients may be periodically set, or fixed values obtained by experiment or otherwise may be set.

In such a case, it is also possible for the threshold altering section 380 only to enlarge the value of the threshold A matching the unique word but not to alter the value of any of other thresholds B through N or, conversely, not to alter the value of the threshold A matching the unique word A but only to reduce the values of all other thresholds B through N.

[Overall Operation]

The overall operation of the radio communication system 1 where the second formula distinguishing program 38 is adapted to the receiving apparatus 3 will be described below.

Incidentally, whereas a case in which the receiving apparatus 3 has received a transmittal signal from the transmitting apparatus 2-A will be described below as a specific example to make the description clear and simple, the operation of the radio communication system 1 and the technical scope of the present invention are not limited to this specific example.

As stated above, the transmitting apparatuses 2-A through 2-N (FIG. 1 and FIG. 2) generate sets of transmittal data containing the unique words A through N in the preambles of their respective transmittal frames (FIG. 3).

Further, each of the transmitting apparatuses 2-A through 2-N generates a transmittal signal from the generated transmittal data, and transmits it to the wireless communication line.

The receiving circuit 300 (FIG. 4) of the receiving apparatus 3 receives the transmittal signal from the transmitting apparatus 2-A, and supplies it to the DSP circuit as an IF signal.

The DSP circuit executes the second formula distinguishing program 38 shown in FIG. 7, and the A/D converting circuit (not shown) of the DSP circuit converts the IF signal entered from the receiving circuit 300 into digital IF data.

Figure 9:
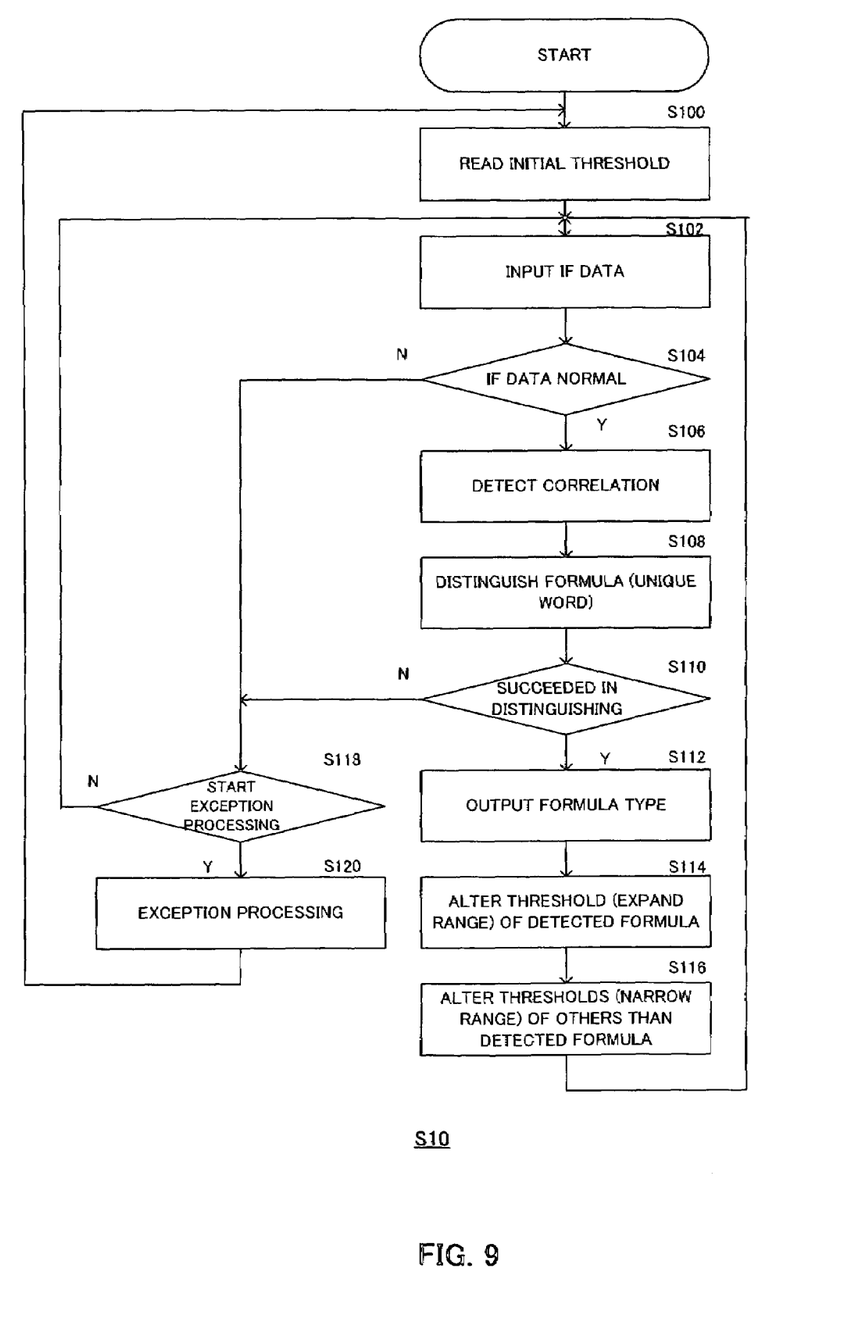
FIG. 9 is a flowchart of the operations (S10) of the receiving apparatus to which the second formula distinguishing program shown in FIG. 7 is adapted.

FIG. 9 is a flowchart of the operations (S10) of the receiving apparatus 3 to which the second formula distinguishing program 38 shown in FIG. 7 is adapted.

As shown in FIG. 9, at step 100 (S100), the threshold altering section 380 of the formula distinguishing program 38 (FIG. 7) reads out the thresholds A through N stored in the threshold storage section 344, and supplies them unaltered to the formula distinguishing section 342.

At step 102 (S102), the processing control section 346 (FIG. 7) accepts the IF data into the correlation detecting section 36.

At step 104 (S104), the processing control section 346 (FIG. 7) determines whether or not the IF data entered from the decoding section 302 is normal.

The formula distinguishing program 38, if the IF data is normal, will proceed to processing at S106 or, if not, to processing at S118.

At step 106 (S106), the correlation detecting section 36 (FIG. 7) generates the correlations A through N indicating respective correlations between the IF data and the unique words A through N entered from the unique word storage section 340, and supplies them to the formula distinguishing section 342.

At step 108 (S108), the formula distinguishing section 342 (FIG. 7) compares the correlations A through N with either the thresholds A through N entered from the threshold altering section 380 at the processing of S100 or the thresholds A' through N' altered by the processing at S114 and S116 to determine whether or not any of the unique words A through N is contained in the received data.

At step 110 (S10), the processing control section 346 (FIG. 7) determines at the timing b shown in FIG. 8 whether or not the formula distinguishing section 342 was able to distinguish any of the unique words A through N from among the received data.

The correlation detecting section 36, if the formula distinguishing section 342 was able to distinguish any unique word, will proceed to processing at S112 or, if not, to processing at S118.

At step 112 (S112), the formula distinguishing section 342 (FIG. 7), on the basis of the result of distinguishment, generates at the timing b shown in FIG. 8(E) formula type data indicating the information transmission rate matching the distinguished unique word, and supplies it.

At step 114 (S114), the threshold altering section 380 (FIG. 7) lowers the threshold matching the unique word distinguished by the formula distinguishing section 342 to expand the range in which that unique word can be detected.

However, once the lower limit is set, the threshold will never be set below the lower limit.

At step 116 (S116), the threshold altering section 380 raises the thresholds matching the unique words other than the one distinguished by the formula distinguishing section 342 to narrow the range in which that unique word can be detected.

The thresholds A through N whose values have been altered by the processing at S114 and S116 are supplied at the timing b shown in FIG. 8(B) through (D) to the formula distinguishing section 342 as the thresholds A' through N'.

However, once the upper limit is set, the threshold will never be set above the upper limit.

At step 118 (S118), the processing control section 346 determines whether or not any of the conditions for exception processing is met, such as IF data has not been entered for a certain period of time or longer or no unique word has been normally distinguishable for a certain period of time or longer.

The formula distinguishing program 38, if exception processing is to be started, will proceed to processing of S120 or, if not, return to the processing of S102.

At step 120 (S120), the processing control section 346 performs exception processing, and the formula distinguishing program 38 returns to the processing of S100.

The timing generating section (FIG. 4) 304, as stated above, generates a timing appropriate for the processing of data at the information transmission rate A indicated by the formula type data A entered from the formula distinguishing section 342 (FIG. 5), and supplies it to the data separating section 306 and the data decoding section 308.

The data separating section 306 separates transmittal data from the transmittal frame (FIG. 3) by performing processing appropriate for the information transmission rate A and matching the multiplexing circuit 202 of the transmitting apparatus 2-A, and supplies the separated data to the data decoding section 308.

The data decoding section 308 decodes the transmittal data by performing processing appropriate for the information transmission rate A and matching the encoding circuit 200 of the transmitting apparatus 2-A.

The data decoding section 308 supplies an external apparatus (not shown) and other destinations with the transmittal data obtained as the result of decoding.

Figure 10:
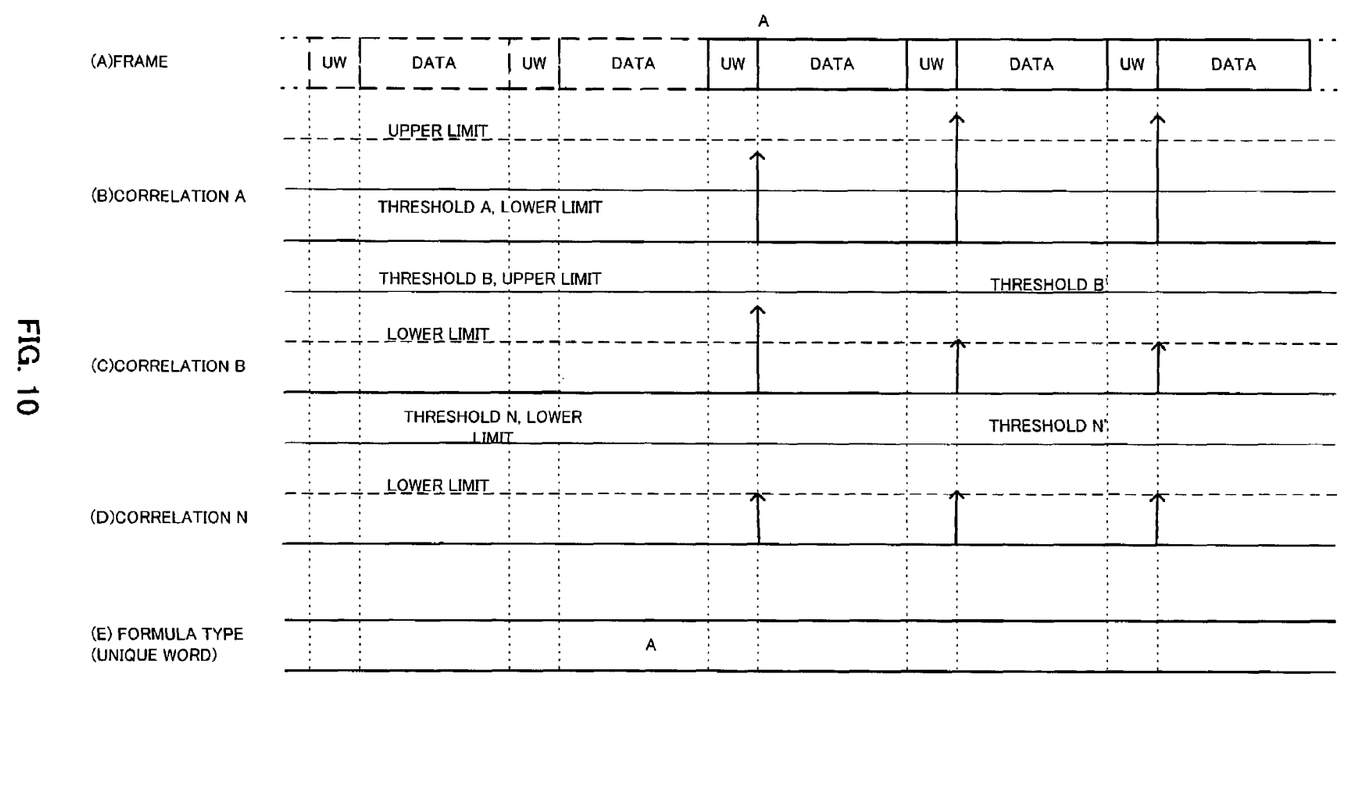
FIG. 10 is a second diagram illustrating typical operations of the receiving apparatus to which the second formula distinguishing program shown in FIG. 7 is adapted, wherein (A) represents the timing of the transmittal frame shown in FIG. 3, (B) through (D) respectively represent correlations A, B and N, and (E) represents a distinguished unique word (formula type data).

FIG. 10 is a second diagram illustrating typical operations of the receiving apparatus 3 to which the second formula distinguishing program 38 shown in FIG. 7 is adapted, wherein (A) represents the timing of the transmittal frame shown in FIG. 3,(B) through (D) respectively represent correlations A, B and N, and (E) represents a distinguished unique word (formula type data).

Herein, the values of the thresholds A through N are constant at either the upper limit or the lower limit of the variable range of thresholds.

In the receiving apparatus 3 to which the first formula distinguishing program 34 not altering the thresholds A through N is adapted, the correlation A (FIG. 6(B)) falls below the threshold A and the correlation B (FIG. 6(C)) rises over the threshold B at the timing a shown in FIG. 6, resulting in erroneous detection of the unique word B from the received data.

In contrast, in the receiving apparatus 3 to which the second formula distinguishing program 38 is adapted, it is seen from FIG. 9 that, even if it is subjected to a disturbance of about the same intensity as that shown in FIG. 6, the unique word B will not be erroneously detected from the received data, resulting in stabilized operation of the receiving apparatus 3.

As hitherto described, the code distinguishing apparatus according to the present invention, irrespective of which of a plurality of conceivable codes may be contained in the transmitted data, can accurately distinguish that code.

Furthermore, the code distinguishing apparatus according to the invention can accurately distinguish from transmitted data, at whatever information transmission rate it may be transmitted, the unique word assigned to it.

What is claimed is:

1. A code distinguishing apparatus for detecting any one of a plurality of codes contained in object data of code distinguishment, each code having its characteristic value, the apparatus comprising:

correlation calculating means for calculating a plurality of correlations indicating a correlation between each of the plurality of codes and the object data, code distinguishing means for distinguishing which of the plurality of codes is contained in the object data based on the plurality of correlations and a plurality of sets of distinguishing data respectively indicating a range of values that the plurality of correlations should have, and distinguishing data altering means for altering the respective values of the plurality of sets of distinguishing data when a code contained in the object data has been distinguished.

2. The code distinguishing apparatus according to claim 1, wherein:

the object data is transmitted by one of a plurality of communication systems, each of the plurality of codes is a unique word which takes a characteristic value matching one of the plurality of communication systems, and the plurality of sets of distinguishing data indicate a lower limit, or an upper limit and the lower limit, of the plurality of correlations.

when any unique word contained in the object data has been distinguished, the distinguishing data altering means expands a range of first sets of distinguishing data that are set for the distinguished unique word and narrows the range of the first sets of distinguishing data that are set for unique words other than the distinguished unique word to obtain a plurality of second sets of distinguishing data, and the code distinguishing means distinguishes, as a unique word contained in the object data, a unique word that gives a correlation within a range indicated by either the first sets of distinguishing data or the second sets of distinguishing data.

* * * * *